Sept. 20, 1971  A. B. EREKSON ET AL  3,605,984
APPARATUS FOR ORIENTING CORE-BEARING FRUIT
Filed July 7, 1969  3 Sheets-Sheet 1

INVENTORS
ARTHUR B. EREKSON
MALCOLM S. LANE
BY
ATTORNEY

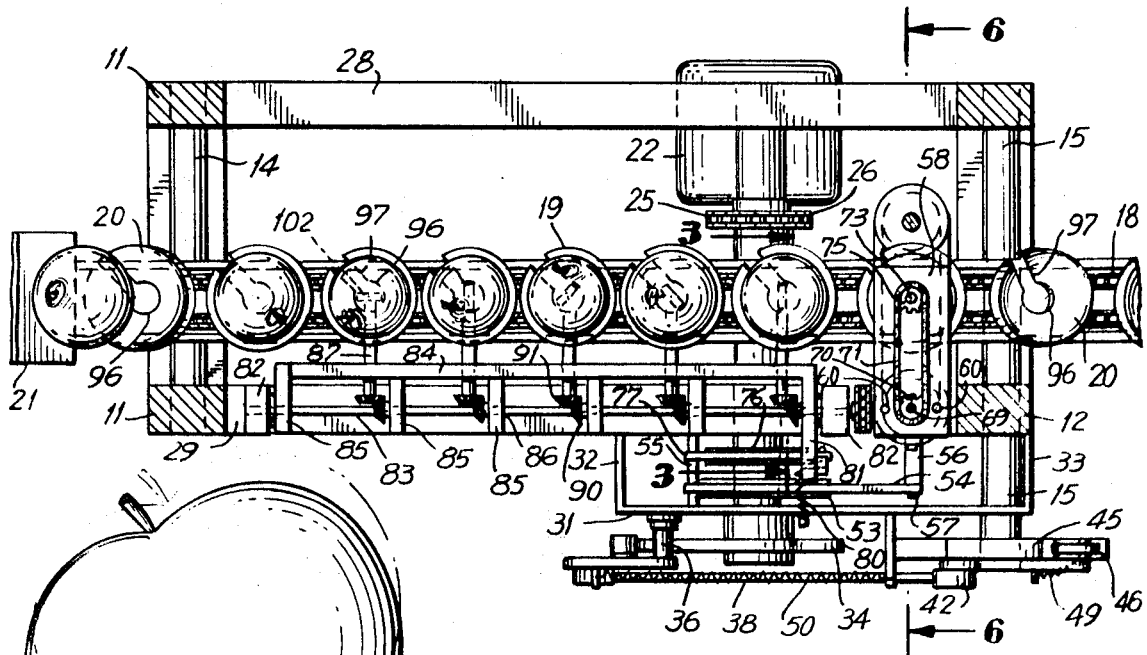
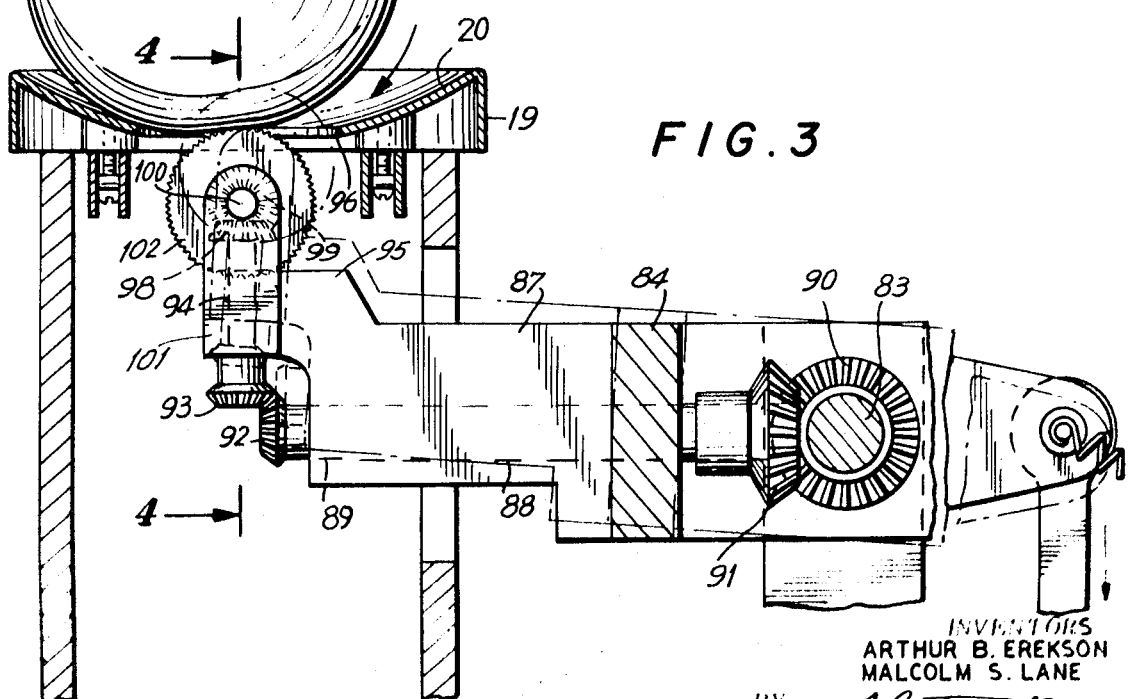

Sept. 20, 1971  A. B. EREKSON ET AL  3,605,984
APPARATUS FOR ORIENTING CORE-BEARING FRUIT
Filed July 7, 1969  3 Sheets-Sheet 3

INVENTORS
ARTHUR B. EREKSON
MALCOLM S. LANE
BY
ATTORNEY

United States Patent Office 3,605,984
Patented Sept. 20, 1971

1

3,605,984
APPARATUS FOR ORIENTING CORE-BEARING FRUIT
Arthur B. Erekson, Scarsdale, N.Y., and Malcolm S. Lane, Baltimore, Md., assignors to Borden, Inc., New York, N.Y.
Filed July 7, 1969, Ser. No. 840,605
Int. Cl. B65g 47/24
U.S. Cl. 198—33AA 3 Claims

ABSTRACT OF THE DISCLOSURE

This invention relates to the method of and apparatus for orienting core-bearing fruit and comprises a cell having an opening, said cell adapted to receive core-bearing fruit, rotation wheels mounted for movement through said opening to subject said fruit to multi-axial rotation out of contact with said cell whereby said core is aligned in a vertical axis.

BACKGROUND OF THE INVENTION

Heretofore, numerous apparatus have been suggested for peeling and paring core-bearing fruits such as apples, pears, and the like, generally consisting of positioning the fruit of prongs and rotating same while a knife engages the circumferential face of the rotating fruit and removes the skin. While this apparatus has proven successful, the volume of processed fruit has been severely restricted by the requirement that the core be situated in a vertical axis on the prongs, thus requiring manual positioning of the fruit. A typical peeling and paring machine is suggested in the patent to Pease, U.S. Pat. No. 1,615,914.

It is generally acknowledged that known peeling machines, acceptable in every other respect are capable of meeting the high demands of the marketplace if feed apparatus were introduced which properly and quickly oriented fruit to be processed by this machine. Moreover, it recognized that elimination of manual handling would be more sanitary and materially reduce the expense of processing fruits.

SUMMARY OF THE INVENTION

The present invention overcomes the stated deficiencies in the prior art and has as its primary object orienting apparatus which efficiently aligns core-bearing fruit whereby the core is disposed in a vertical axis. More particularly, the present invention comprises a plurality of spaced, driven rollers, each disposed in a non-parallel vertical plane, which contact and suspend the spheroidal fruit and subject it to multi-axial rotation as it is advanced until the cores are properly positioned. Thereafter, a vertically reciprocal rotation shaft seeks out the detent of one core end while substantially concurrently transport means comprising a plurality of spaced, rounded blades seeks out the opposite detent whereby said core is positively retained in a vertical axis prior to conveyance to said peeling machine.

BRIEF DESCRIPTION OF THE DRAWINGS

FIG. 2 is a cross-section view along line II—II in FIG. 1.
FIG. 3 is a detailed view of one of the orienting arms of the present invention.

2

Figure 7:
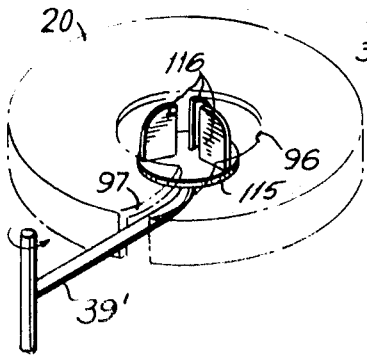

FIG. 7 is a detail view of the blades used to transport the oriented fruit to the peeling machine.

DETAILED DESCRIPTION OF THE INVENTION

Referring now to the preferred embodiment of the present invention, the orienting apparatus 10 is positioned on a frame defined by pairs of vertical, parallel stanchions 11 and 12 joined by horizontal braces 13. A pair of parallel shafts 14 and 15 are journaled in the stanchions; sprockets 16 and 17 are mounted on shafts respectively. An endless chain 18 is entrained about the sprockets and includes a plurality of equally spaced cups 19 along its entire length secured to the chain outer surface in a conventional manner; each cup includes a concave cavity 20. Suitable conveyor means (not shown) supply fruit to chute 21 aligned with the path of movement of the chain to continuously deposit core-bearing fruit such as apples, pears, and the like, in each of the spaced cups.

A conventional motor 22 such as an electric, hydraulic, pneumatic, or internal-combustion engine is disposed between the upstanding stanchions; its armature is provided with sprocket 24 about which is entrained chain 25. The chain drivingly engages the sprocket 26 on shaft 27 spaced vertically above the armature 23 and parallel thereto.

Shaft 27 is journaled at one end in horizontal brace 28 extending between the two stanchions. A pair of parallel horizontal braces 29 and 30 extend between the stanchions on the side of the frame opposite brace 28. A partition 31, disposed in a vertical plane parallel to braces 29 and 30, is retained by an integral leg 32 secured to the braces at one end and a second integral leg 33 secured to stanchion 12 at the other. The free end of shaft 27 is journaled in the partition 31; torque transmitted via chain 25 rotates the shaft.

A cam 34 is positioned on the free end of shaft 27 outside partition 31. An arm 35 is pivotally secured by pin 36 to vertical stub shaft 37 secured to the partition 31. A link 38 is pivotally secured to the free end of arm 35 by pivot pin 39. A roller 40 is rotatably mounted to the arm near the midpoint by pin 41 and contacts the face of the cam: reciprocal movement is imparted to link 38 by rotation of cam 34. The opposite end of link 38 is pivotally secured to rotatable arm 42 by pivot pin 43.

The arm 42 includes a centrally positioned aperture 44 which receives the shaft 15 for movement relative thereto. Juxtaposed with the arm is a ratchet 45 secured to the shaft 15: the free end of arm 42 includes a pawl 46 pivotally secured by pin 47 which engages the angularly spaced, peripheral notches 48 of ratchet 45. Spring 49 on the arm exerts a bias on the pawl to maintain same against the notched edge of the ratchet. When cam 34 reciprocates link 38 through one cycle, the ratchet 45 is rotated clockwise an angular distance sufficient to permit the pawl to engage the next succeeding notch 48: the chain 18 is advanced linearly a predetermined distance so that the vertical axis of each cup is aligned with the axis vacated by the preceding cup. A spring 50 interconnects arm 35 to partition 31 by pins 52, 51 respectively: the bias of the spring maintains contact between roller 40 and cam 34.

A second cam 53 is positioned on shaft 27 within the compartment defined by partition 31 and integral legs 32, 33. A link 54 is pivotally connected at one end to pin 55 projecting at right angles to the partition 31; the free end of link 54 is pivotally secured to upstanding arm 56 by pivot pin 57. The link is pivotal about pin 55 in the vertical plane defined by cam 53 and contacts the cam face intermediate its ends to reciprocate arm 56 vertically.

A block 58, provided with parallel bores 59, receives for relative movement upstanding parallel guide rods 60; the latter members are rigidly secured to brace 29. A pin 61 is adjustably secured in one face of the block and is received in the slot 62 at the free end of arm 56 to establish a lost motion connection. Rotation of cam 53 imparts an upward thrust to link 54 to elevate the block 58 on guide rods 60; the weight of the block is quite heavy so that the link is always in contact with the cam.

Figure 1:
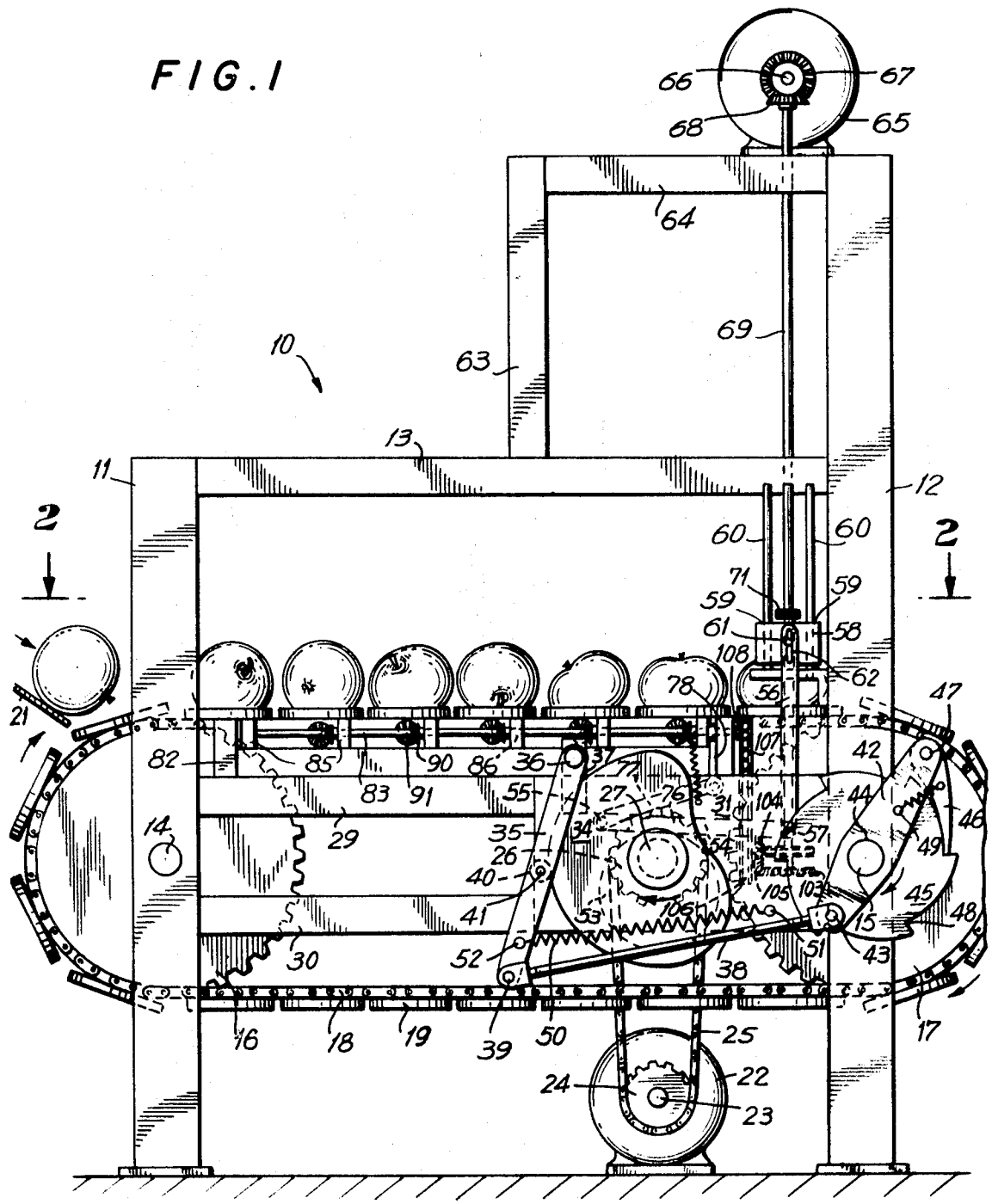
FIG. 1 is a side elevational view of the preferred embodiment of the present invention.

As is best seen in FIG. 1, a vertical brace 63 is secured to horizontal brace 13 intermediate its ends; the upper end of brace 63 is intersected by horizontal brace 64 to define a horizontal platform with stanchion 12. A conventional motor 65 is provided on the platform whose armature 66 drives meshing bevel gears 67 and 68 to impart torque to shaft 69. A vertically reciprocal sprocket 70 is received on a spline provided on the circumferential face of shaft 69; a conventional bushing permits rotation of the sprocket relative to the block but insures concurrent vertical reciprocation of the two as block 58 is moved on guide rods 60. Shaft 69 passes through enlarged aperture 72 in block 58; a stub shaft 73 is journaled in block 58 and includes a hemispherical free end 74 depending from the lower face of the block and overlying the path of travel of cups 19. A sprocket 75 is provided on the opposite end of the shaft 73 and is drivingly engaged by chain 71. By this arrangement, torque may be transmitted to stub shaft 73 during reciprocation of block 58 on guide rods 60.

A third cam 76 is spaced inwardly of cam 53 on shaft 27. Link 77 is pivotally mounted to the pin 55 at one end and to vertically disposed arm 78 by pivot pin 79 at the other; the link is aligned in the vertical plane of cam 76 and retained in contact therewith by spring 80. The edge of cam 76 includes a plurality of angularly spaced projections to impart arrythmic motion to link 77 during rotation. The arm 78 is pivotally connected at its upper end to a second horizontal arm 81.

As is best seen in FIG. 2, a pair of spaced mounting blocks 82 are secured to the upper face of brace 29 and rotatably mounted shaft 83. A longitudinal brace 84 is disposed in parallel relation to shaft 83 and includes a plurality of legs 85 extending at right angles thereto; each leg includes an aperture 86 aligned to receive the shaft 83. The arm 81 defines the end leg of brace 84 which also has an aperture to receive shaft 83. As the cam 76 rotates link 77 about pin 55, the brace 84 is rotated angularly about an axis defined by the shaft 83.

Extending at right angles from brace 84, on the opposite side of legs 85, are a plurality of spaced arms 87. A discussion is given of one of the arms 87, it being understood that each of the arms comprises similar torque transmission structure, though the rollers mounted on the arms and to which the torque is conveyed are arranged in non-parallel, vertical planes, as will appear hereinafter. A longitudinal bore 88 extends over the length of each arm and receives a shaft 89 for relative rotation therein. Shaft 89 projects through brace 84 adjacent shaft 83; bevel gears 90, 91 on shafts 83 and 89 respectively mesh and by the relationship torque is imparted to shaft 89 as brace 84 is rotated about an axis defined by shaft 83.

Figure 4:
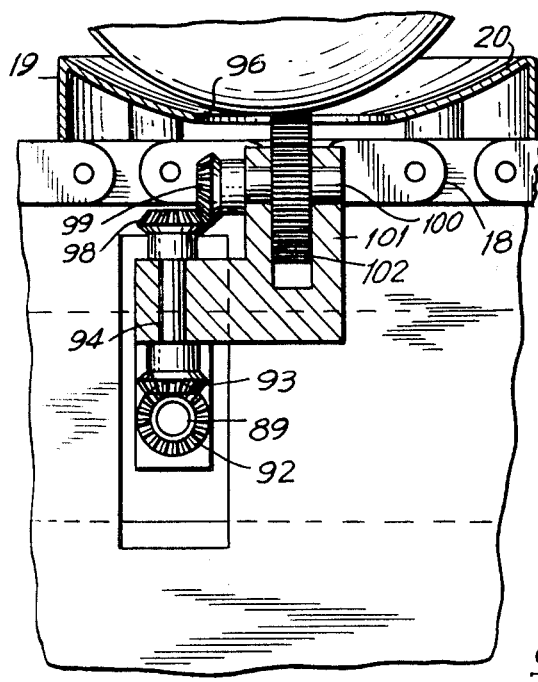
FIG. 4 is a cross-section view along line IV—IV in FIG. 3.
Figure 5:
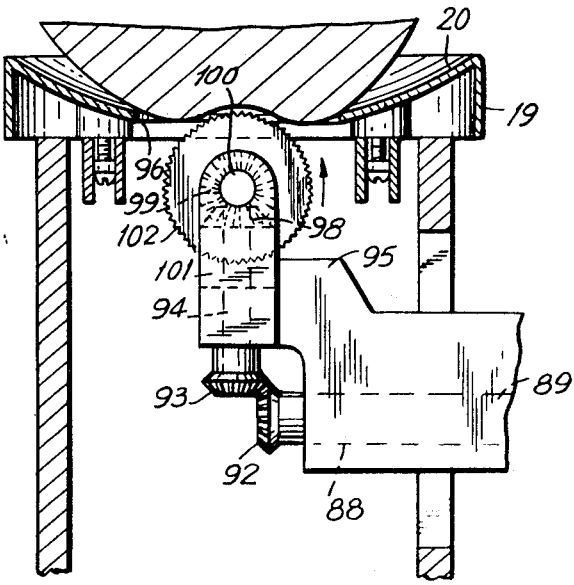
FIG. 5 is a detail view of the orienting arm illustrating the fruit disposed in the proper orientation.

As is seen in FIGS. 3, 4 and 5, the opposite end of shaft 89 is provided with bevel gear 92 which meshes with bevel gear 93 on vertical shaft 94. Shaft 94 is rotatably mounted in integral leg 95 of arm 87 beneath the path of travel of cups 19 on chain 18. Each of the cups is provided with a central aperture 96, and a diametrically extending slot 97. The upper free end of vertical shaft 94 is provided with a bevel gear 98 which meshes with bevel gear 99 on horizontal shaft 100; the latter is journaled in bifurcated extension 101 of leg 95. A roller 102 having a knurled circumferential face to promote friction is secured to shaft 100 in the bifurcated opening defined in the extension and is situated beneath the cup opening 96. The roller 102 has a pre-selected diameter to project a determined amount into the cup as arm 87 is rotated clockwise about shaft 83 to engage the face of spherical face of the core-bearing fruit disposed therein.

As is illustrated in FIG. 2, each roller 102 on the spaced arms 87 is mounted for rotation in a non-parallel vertical plane; consequently, when each roller projects through the aperture 96 of the cups, the fruit resting therein is subjected to a different axis of rotation than at the preceding station. This multi-axial rotation assures that the fruit is subjected to several axial movements until the core assumes a vertical disposition in the absence of such multi-axial rotation, fruit core axes parallel to the axis of rotation of a single roller would never assume the proper alignment. The spacing of arms 87 on brace 84 to position its respective roller 102 beneath the equally spaced cups 19, is unequal because of the non-parallel vertical planes of the rollers. As cam 76 is rotated by shaft 27, arm 77 in contact therewith encounters the spaced projections on the cam face and irregular rotation is imparted to arm 81 resulting in intermittent movement of the rollers 102 through the apertures 96 to contact the fruit.

Extent of roller insertion into the cup is sufficient to suspend fruit for an instant on the roller; i.e., the fruit is moved out of contact with the concave face of the cup. However, fruit roller contact is obviated if the fruit core is situated in a vertical axis (see FIG. 5) because the indents at both the blossom and stem ends of the core receive the wheel. As chain 18 is intermittently advanced by the periodic rotation of ratchet 45, the cups are positioned over the next succeeding wheel and subjected to a new angular rotation; the intermittent movement of the wheel in and out of aperture 96 realigns the fruit until the core is properly disposed in a vertical axis. It should be appreciated that any number of wheels could be provided to effectively and efficiently achieve this result.

Figure 6:
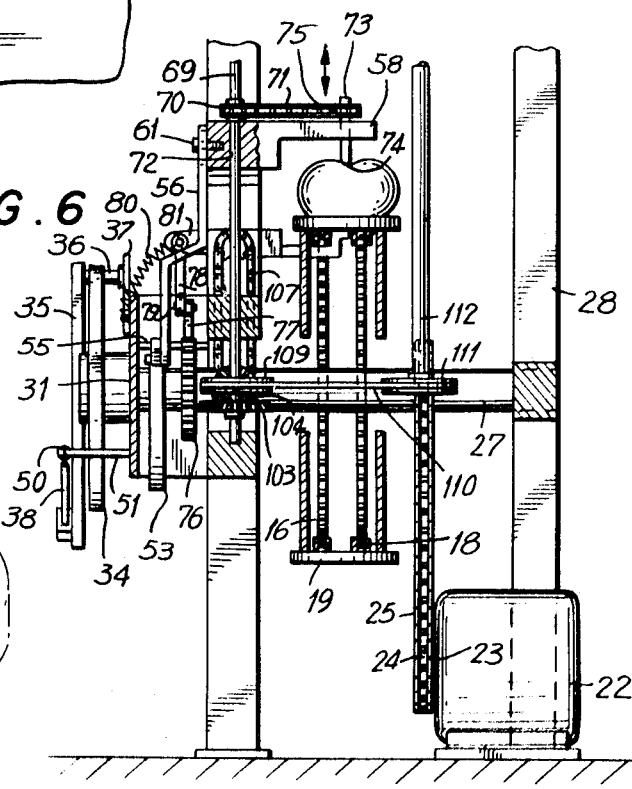
FIG. 6 is a cross-section view along line VI—VI of FIG. 2.

As is best seen in FIG. 6, a bevel gear 103 on driven vertical shaft 69 meshes with bevel gear 104 on horizontal shaft 105 journaled in parallel relation with shaft 83 and spaced therebeneath. A sprocket 106 on shaft 105 is aligned beneath sprocket 108 on shaft 83 and chain 107 is entrained about the sprockets to impart torque to shaft 83 and thus drive the rollers 102.

The orienting apparatus here disclosed is to be used as the supply means for the fruit-peeling apparatus disclosed in the patent to Pease (U.S. Pat. No. 1,615,914). In Pease, arm 39 is rotatable about a vertical axis to pick up fruit in cup 40 disposed on the free end to transport same to the peeler. The fruit core is manually positioned in a vertical axis of the cup. The arm is elevated to force the fruit in the cup on to prongs 15 for peeling and paring.

OPERATION

Core-bearing fruit is suppied from chute 21 into each of the equally spaced cups 19 on chain 18 which is advanced intermittently by the linkage 38 periodically rotating ratchet 45; the linear movement of the chain 18 repositions each cup above the next succeeding roller 102 and the leading cup having fruit therein beneath shaft 73 on block 58. The link 77 in contact with cam 76 is pivoted clockwise about pin 55 to rotate arm 81 in a counterclockwise direction and move wheels 102 through the apertures 96 to contact unaligned fruit. As the same time the link 54 in contact with cam 53 draws block 58 downwardly so that the rotating shaft 73 contacts the upper indent of the core. The blades 116 on arm 39 moves upwardly through aperture 96 to penetrate the fruit and thereafter, withdrawal of the fruit fixed to the blades is effected through the diametrical slot 97 to the peeling and paring apparatus. The cam 34 displaces arm 35 to advance the ratchet 45 one cycle to reposition the cups in the next station. The rotation of stub shaft 73 in contact with the upper surface of the fruit "seeks" the indent at the upper end of the core to assure that the oriented fruit is properly positioned on the knife of arm 39.

In the present invention, the cup 40 of Pease is replaced with a plurality of knife blades angularly spaced about a vertical axis aligned with arm free end. The blades are adapted to contact the fruit concurrently with the downward movement of the shaft 73 which maintains the vertical disposition of the core. As is best seen in FIG. 7, the free end of Pease's arm 39 is provided with a circular flange 115 whose diameter is less than aperture 96: a plurality of blades 116 are angularly spaced about a central vertical axis. The upper edge of each blade is rounded outwardly whereby the blades define a hemispherical dome; when arm 39 is passed through opening 96, the dome-like blades are received in the lower detent of the fruit core. Movement of the arm upwardly through the aperture 96 is concurrent with downward movement of the shaft 73 which seeks out the upper core detent to stabilize the fruit as the blades 116 penetrate same. The spacing of the blades permits relative movement of any fruit stem disposed in the lower detent: it should be appreciated that a stem may project from the upper or lower detent. Removal of the arm from the cup 20 is effected through diametrical slot 97.

What is claimed is:

1. Apparatus for orienting core-bearing fruit comprising a conveyor having a plurality of equally spaced cells, each cell having an open bottom, said conveyor being intermittently advanced whereby said linear movement is limited to the dimension between each cell; a plurality of driven rollers spaced beneath said openings for movement into said cell, said rollers being disposed in nonparalleled vertical planes; means for moving said rollers through the opening intermittently to subject said fruit to multi-axial rotation whereby the axis through the core of said fruit is aligned in a vertical plane; means for transporting said fruit from said cells; means operatively associated with said conveying means for contacting the upper recess of each core to insure that each core is retained in the vertical plane.

2. Apparatus according to claim 1 including aligning means operatively associated with said conveying means receivable in the upper detent of said core to stabilize said vertically positioned core, and transport means including a plurality of blades defining a hemispherical plane received in the lower detent, said aligning means and said transport means contacting said fruit substantially concurrently.

3. Apparatus of claim 2 wherein said core-bearing fruit is apples.

References Cited
UNITED STATES PATENTS 3,225,892  12/1965  Keesling _____ 198—33($R_1$)
3,310,152   3/1967  Elford _____ 198—33($R_1$)

ANDRES H. NIELSEN, Primary Examiner